United States Patent Office 3,492,018
Patented Jan. 27, 1970

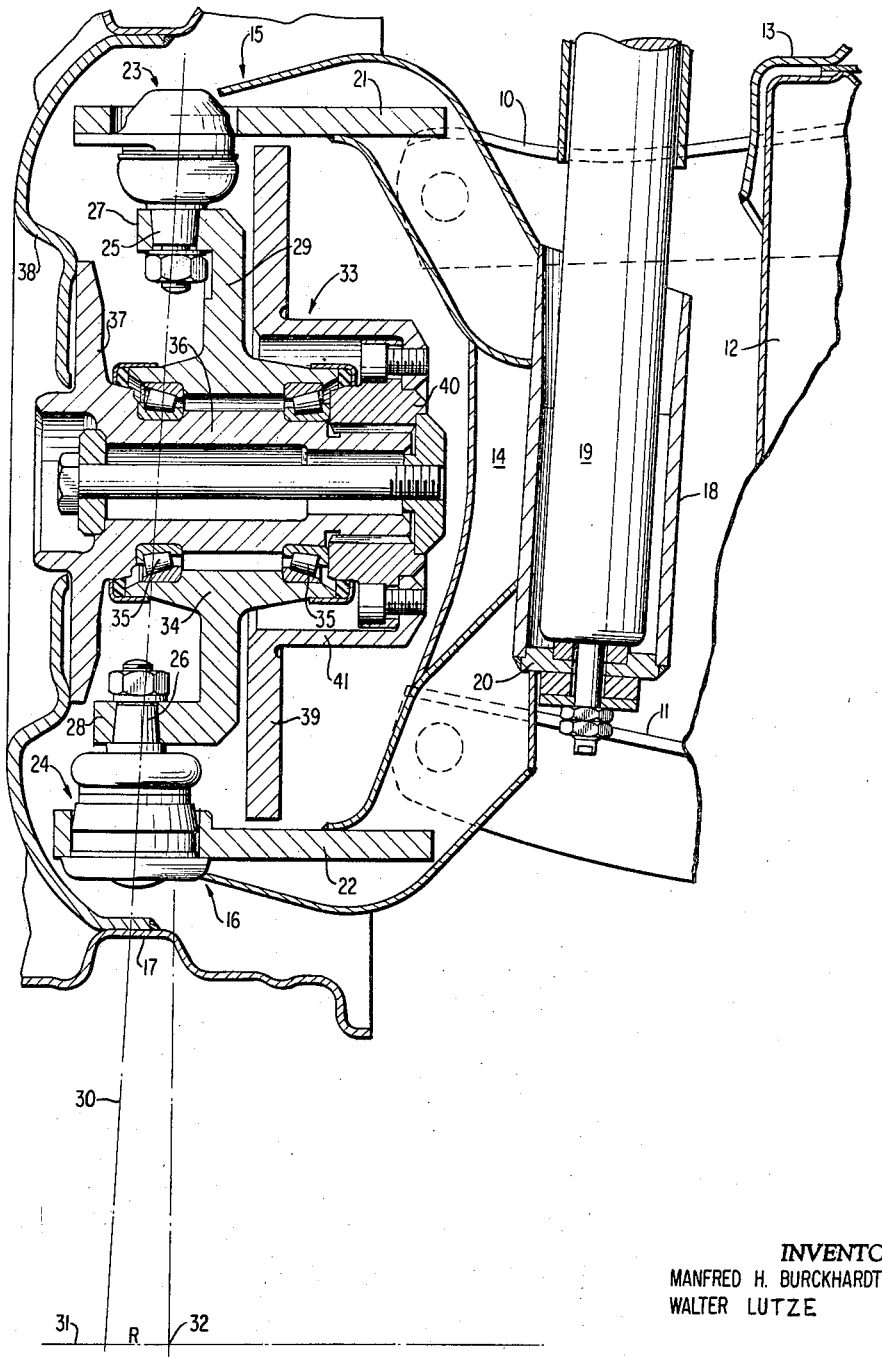
INVENTORS
MANFRED H. BURCKHARDT
WALTER LUTZE
BY *Craig & Antonelli*
ATTORNEYS

3,492,018
WHEEL SUSPENSION FOR STEERABLE MOTOR VEHICLE WHEELS, ESPECIALLY MOTOR VEHICLE FRONT WHEELS HAVING A NEGATIVE ROLL RADIUS
Manfred H. Burckhardt, Waiblingen, and Walter Lutze, Esslingen (Neckar), Germany, assignors to Daimler-Benz Aktiengesellschaft, Stuttgart-Unterturkheim, Germany
Filed Mar. 6, 1968, Ser. No. 710,966
Claims priority, application Germany, Mar. 7, 1967, D 52,455
Int. Cl. B60g 3/06, 25/00
U.S. Cl. 280—96.2  16 Claims

ABSTRACT OF THE DISCLOSURE

A wheel suspension for steerable motor vehicle wheels, especially for the front wheels of a motor vehicle with a negative roll radius of the wheel, in which wheel guide members engage at an essentially C-shaped, upright bracket or yoke which carries a bearing housing for the wheel pin at its ends extended into the wheel rim by means of ball joints whereby the bearing housing is disposed on the inside of the ball joints; the wheel pin or journal itself carries on the outside of the bearing housing the wheel dish and on the inside of the bearing housing the wheel brake.

BACKGROUND OF THE INVENTION

The present invention relates to a wheel suspension for steerable motor vehicle wheels especially for motor vehicle front wheels having a negative roll radius.

Such types of wheel suspension are already known in the German Patent 1,077,538. They have essentially the advantage that the tendency to swerve with unequal moments of the two front wheels is considerably reduced. On the other hand, the types of constructions illustrated in this patent require large constructive expenditures. The negative roll radius is achieved in this German patent in part by an excessively large inclination of the king pin or steering knuckle and by a very large camber of the wheel which, however, has other disadvantages.

SUMMARY OF THE INVENTION

The present invention aims at a structurally simple wheel suspension with negative roll radius whereby the inclination of the king pin or knuckle part and the camber are to remain within normal limits. Additionally, the present invention aims at so constructing this wheel suspension that with respect to the initial arrangement with positive roll radius, in principle no changes occur as regards spring characteristics as well as the entire axle kinematics.

The underlying problems are solved according to the present invention with the wheel suspension of the type described above in that the wheel guide members engage at an essentially C-shaped, upright bracket or yoke which, in turn, supports with its ends extended into the wheel rim by means of ball joints, a bearing housing for the wheel journal or pin, which bearing housing is disposed on the inside of the ball joints. The present invention thereby contemplates in general to extend the C-shaped bracket with its ends to such an extent into the wheel rim that the bearing housing is disposed approximately in the symmetry plane of the wheel. Since the ball joints are then disposed outside, a negative roll radius is achieved already in this manner.

This negative roll radius can be further increased in that the ball center points are not disposed vertically one above the other but exhibit a normal inclination (inclination of the king pin or knuckle part). The construction of the wheel guide members is in principle without importance. However, the present invention contemplates primarily a wheel guide system with transverse guide members.

The construction according to the present invention results in a structurally simple wheel suspension in which a sufficiently large negative roll radius can be achieved also without excessive inclination of the steering pivot or steering knuckle or without excessively large camber. It is thereby essential that an already existing front axle having a positive roll radius can be converted without large changes—solely by the installation of a C-shaped bracket with the changed position—into an axle with negative roll radius.

The present invention prefers a construction in which the wheel pin or journal supported in the hub of the bearing housing carries on the outside of the bearing housing the wheel dish and on the inside of the bearing housing the wheel brake. The latter can be constructed as drum- or disk-brake. The last-mentioned construction is thereby preferred.

The present invention additionally prefers a construction according to which the steering lever engages at the bearing housing externally in a horizontal cross plane. The steering lever is thereby guided about the brake— in a manner similar to the C-arms of the bracket.

It has already been mentioned above that in principle the normal and conventional spring system, wheel guide kinematics and shock absorber arrangement can be retained. However, the shock absorber arrangement can be further improved in that the shock absorber is arranged according to the present invention between the C-shaped bracket and a part of the vehicle frame. This produces an increase of the shock absorber path which is quite desirable. In particular, the present invention proposes therefor that the C-shaped bracket forms at its base an upright, tubular piece, open at the top, into which the shock absorber engages from above which is secured at the lower bottom of this tubular piece.

Accordingly, it is an object of the present invention to provide a wheel suspension for steerable vehicle wheels of the type described above which avoids the aforementioned shortcomings and drawbacks encountered in the prior art.

Another object of the present invention resides in a wheel suspension for steerable front wheels of motor vehicles which produces a negative roll radius of the wheel without large constructional expenditures.

A further object of the present invention resides in a wheel suspension of the type described above which enables the attainment of a negative roll radius without excessive inclination of the steering pivot and/or excessive camber of the wheel.

Still another object of the present invention resides in a wheel suspension which is so constructed and arranged that a wheel having a positive roll radius can be converted simply by the installation of an additional part into a wheel suspension having a negative roll radius without otherwise affecting the spring characteristics and axle kinematics of the wheel.

A still further object of the present invention resides in a wheel suspension of the type described above which also permits a further improvement in the shock absorber arrangement.

These and further objects, features and advantages of the present invention will become more obvious from the following description when taken in connection with the accompanying drawing which shows, for purposes of illustration only, one embodiment in accordance with the present invention and wherein:

The single figure is a partial cross-sectional view through one embodiment of a wheel suspension in accordance with the present invention.

Referring now to the single figure of the drawing, reference numerals 10 and 11 designate therein the schematically illustrated cross guide members of any conventional construction which are pivotally connected in a conventional manner with the frame (not shown) of the motor vehicle. The lower cross guide member 11 is supported at a frame part 13 by way of a pneumatic spring element 12 of conventional construction. Both cross guide members 10 and 11 engage with their outer ends at a bracket or yoke 14. The bracket or yoke 14 is constructed in a C-shaped manner and protrudes with its extended ends generally designated by reference numerals 15 and 16 far into the wheel rim 17. A tubular piece 18 is located at the base of the bracket 14 into which engages the shock absorber 19 from above. The shock absorber 19 is secured at its lower end at the bottom 20 of the tubular piece 18 and is supported at the top in a conventional manner at a fixed frame part.

Plates 21 and 22 are conventionally secured at the ends 15 and 16 of the bracket 14; conventional ball joints generally designated by reference numerals 23 and 24 are inserted externally by means of the outer bodies thereof into the plates 21 and 22. The ball pins 25 and 26 of the two ball joints 23 and 24 are secured in the outwardly facing eyes 27 and 28 of a bearing housing 29 which, viewed in its entirety, is disposed on the inside of the ball joints 23 and 24. The arrangement is thereby so made that this bearing housing 29 is disposed in proximity to the symmetry plane of the wheel. The ball joints 23 and 24 may be disposed vertically above one another. However, they may also be inclined in a conventional manner, as shown in the drawing, so that the pivot axis 30 of the wheel determined by the two ball joints 23 and 24 intercepts the road surface 31 outside of the center point of contact 32 of the wheel. In this manner, the wheel obtains the negative roll radius R.

The bearing housing 29 which, as mentioned already hereinabove, can be disposed essentially in the plane of the symmetry of the wheel, is constructed approximately disk-shaped and is provided with the already mentioned, outwardly facing eyes 27 and 28. The steering lever is arranged at the bearing housing 29 approximately in the horizontal cross plane of the wheel in a manner not illustrated in detail herein. The bearing housing 29 is disposed between the ball joints 23 and 24 located on the outside thereof and the brake generally designated by reference numeral 33 disposed on the inside thereof.

The hub 34 of the bearing housing 29 receives the wheel pin or journal 36 by means of two conical roller bearings 35. The wheel pin or journal 36 is provided outwardly with a flange 37 at which is secured the wheel dish 38. The wheel pin 36 receives on its inside the brake disk 39 of the wheel brake 33 constructed as disk brake. For that purpose a hub part 40 is arranged on the inner side thereof by means of a splined tooth connection; the brake disk 39 is then secured at the hub part 40 by means of its centrally inwardly turned pot portion 41.

It can be readily seen that a sufficiently large negative roll radius R can be achieved with the proposal according to the present invention without an especially inclination of the steering pivot or steering knuckle. Also the wheel camber need not have any particularly large value for that purpose. It is also feasible within the scope of the present invention to essentially retain a normal wheel suspension and to change the same into a wheel suspension with negative roll radius exclusively by the installation of the bracket 14.

While we have shown and described only one embodiment in accordance with the present invention, it is understood that the same is not limited thereto but is susceptible of numerous changes and modifications as known to a person skilled in the art, and we therefore do not wish to be limited to the details shown and described herein.

We claim:

1. A wheel suspension for steerable motor vehicle wheels, especially motor vehicle front wheels with a negative roll radius of the wheel, wherein the improvement comprises wheel guide means, substantially C-shaped upright bracket means, said wheel guide means engaging at said bracket means, wheel rim means, bearing housing means for a wheel pin, said bracket means carrying with the ends thereof extended into the wheel rim means said bearing housing means by way of ball joint means, and said bearing housing means being disposed on the inner side of the ball joint means.

2. The wheel suspension according to claim 1, wherein said bearing housing means includes a hub portion, said wheel pin means being supported within said hub portion and carrying on the outside of the bearing housing means a wheel dish and on the inside thereof a wheel brake means.

3. A wheel suspension according to claim 2, further comprising steering lever means engaging at said bearing housing means externally in an essentially horizontal cross plane.

4. A wheel suspension according to claim 3, further comprising shock absorber means arranged between said bracket means and a part of the vehicle frame.

5. A wheel suspension according to claim 4, wherein said bracket means forms at its base an upright, open tubular piece into which engages from above said shock absorber means, and said shock absorber means being connected at the lower bottom of this tubular piece.

6. A wheel suspension according to claim 1, further comprising steering lever means engaging at said bearing housing means externally in an essentially horizontal cross plane.

7. A wheel suspension according to claim 1, further comprising shock absorber means arranged between said bracket means and a part of the vehicle frame.

8. A wheel suspension according to claim 7, wherein said bracket means forms at its base an upright, open tubular piece into which engages from above said shock absorber means, and said shock absorber means being connected at the lower bottom of this tubular piece.

9. A wheel suspension for steerable motor vehicle wheels, especially motor vehicle front wheels with a negative roll radius of the wheel, wherein the improvement comprises wheel guide means, substantially C-shaped upright bracket means, said wheel guide means engaging at said bracket means, bearing housing means, ball joint means between said bearing housing means and said bracket means, and said bearing housing means being disposed inwardly of the ball joint means.

10. A wheel suspension according to claim 9, wherein said bearing housing means is disposed approximately in the plane of symmetry of the wheel.

11. A wheel suspension according to claim 10, wherein said ball joint means form an axis extending at an angle to the vertical direction.

12. The wheel suspension according to claim 11, wherein said bearing housing means includes a hub portion, wheel pin means supported within said hub portion and carrying on the outside of the bearing housing means a wheel dish and on the inside thereof a wheel brake means,

13. A wheel suspension according to claim 12, further comprising shock absorber means arranged between said bracket means and a part of the vehicle frame.

14. A wheel suspension according to claim 9, wherein said ball joint means form an axis extending at an angle to the vertical direction.

15. The wheel suspension according to claim 14, wherein said bearing housing means includes a hub portion, wheel pin means supported within said hub portion and carrying on the outside of the bearing housing means a wheel dish and on the inside thereof a wheel brake means.

16. A wheel suspension according to claim 14, further comprising shock absorber means arranged between said bracket means and a part of the vehicle frame.

References Cited

UNITED STATES PATENTS

| | | | |
|---|---|---|---|
| 2,173,973 | 9/1939 | Leighton | 280—124 X |
| 2,756,067 | 7/1956 | Porsche et al. | 267—20 |

FOREIGN PATENTS

| | | |
|---|---|---|
| 595,880 | 7/1959 | Italy. |
| 1,077,538 | 9/1960 | Germany. |

KENNETH H. BETTS, Primary Examiner

U.S. Cl. X.R.

280—96.3